Sept. 29, 1925.
H. B. HERSHINGER
GREASE GUN
Filed Oct. 26, 1921
1,555,711
2 Sheets-Sheet 1
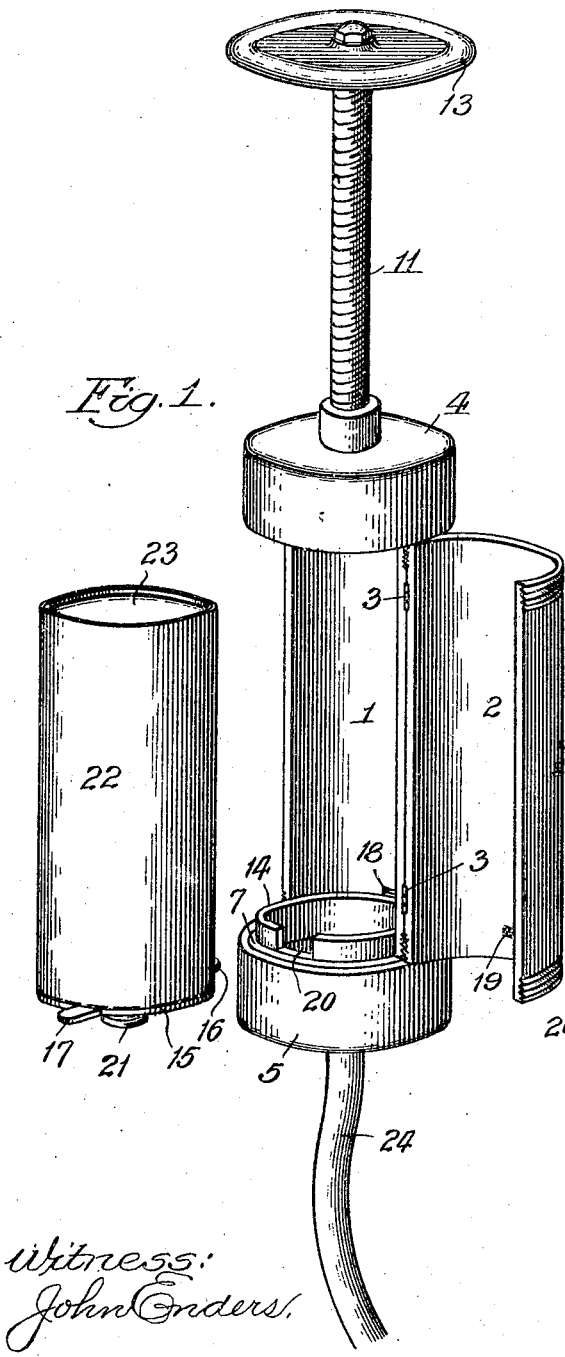
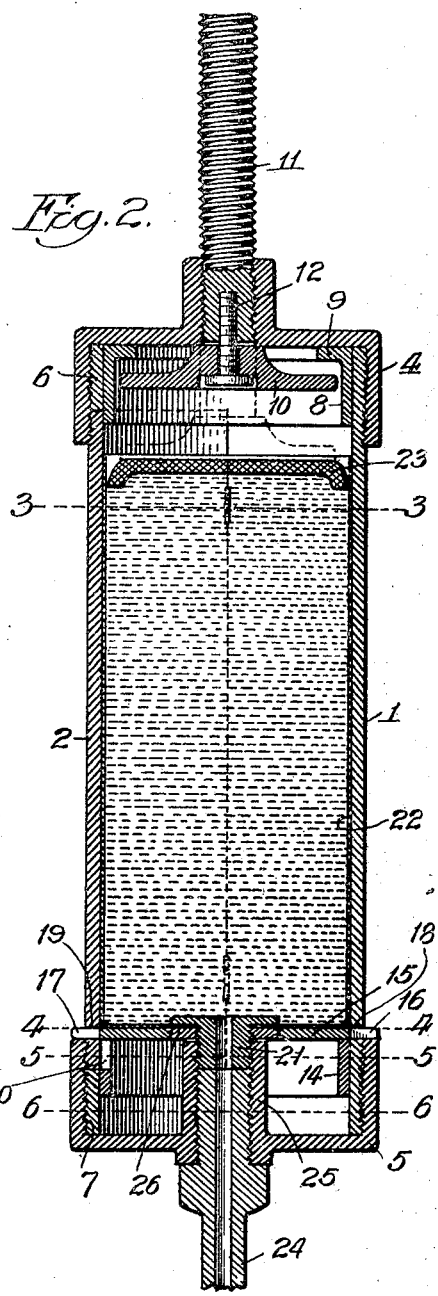
Witness:
John Enders.
Inventor:
Harry B. Hershinger
by Wallace R. Lane.
Atty.

Sept. 29, 1925.  H. B. HERSHINGER  1,555,711
GREASE GUN
Filed Oct. 26, 1921    2 Sheets-Sheet 2

Witness:
John Enders

Inventor
Harry B. Hershinger,
by Wallace R. Lane
Atty.

Patented Sept. 29, 1925.

1,555,711

UNITED STATES PATENT OFFICE.

HARRY B. HERSHINGER, OF CHICAGO, ILLINOIS.

GREASE GUN.

Application filed October 26, 1921. Serial No. 510,474.

*To all whom it may concern:*

Be it known that I, HARRY B. HERSHINGER, a citizen of the United States, residing at Chicago, county of Cook, and State of Illinois, have invented certain new and useful Improvements in Grease Guns, of which the following is a specification.

My invention relates more particularly to grease guns of the cartridge type, that is, those which may be opened up for the reception of a refill cartridge and among the objects of my invention are: to provide for convenient refilling of grease guns; to provide an improved construction of grease gun; to provide a grease gun of such construction that the grease container can be conveniently removed and replaced; and such further objects, advantages and capabilities as will later more fully appear.

My invention further resides in the combination, construction and arrangement of parts illustrated in the accompanying drawings and, while I have shown therein preferred embodiments, I desire the same to be understood as illustrative only and not as limiting my invention.

In the drawings annexed hereto and forming a part hereof:

Fig. 1 is a detached perspective view of a construction according to my invention.

Fig. 2 is a fragmentary longitudinal section of such a construction.

Figure 3:
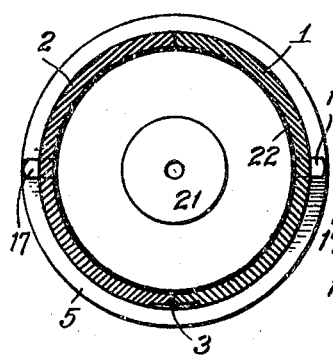
Fig. 3 is a cross-section substantially along the plane indicated by the line 3—3 Fig. 2.
Figure 4:
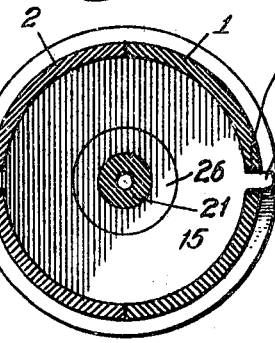
Fig. 4 is a section substantially along the plane indicated by the line 4—4 Fig. 2.
Figure 5:
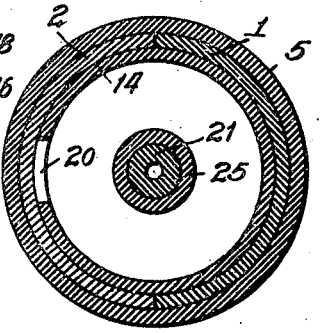
Fig. 5 is a section substantially along the plane indicated by the line 5—5 Fig. 2.
Figure 7:
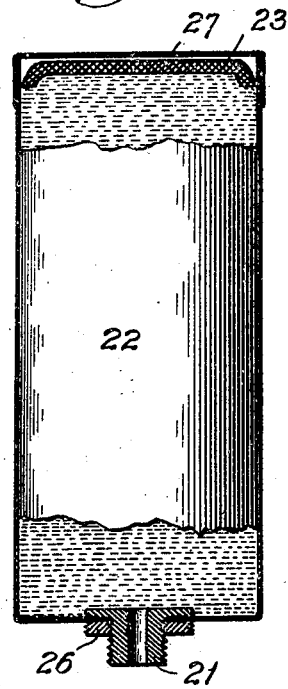
Fig. 7 is a view, partially in section, of a cartridge for the refilling of this gun.
Figure 6:
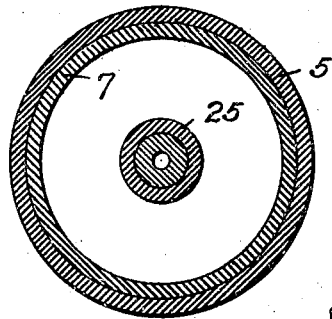
Fig. 6 is a section substantially along the plane indicated by the line 6—6 Fig. 2.

Referring more in detail to the annexed drawings, numeral 1 designates in general the body of the grease gun having cut out of one wall thereof a door 2, which door is hinged as at 3 to the main body portion so that it may be swung open. The body portion 1 is preferably cylindrical in form and has its ends provided with means, preferably screw threads, for the attachment of caps 4 and 5, the former being referred to herein as the manipulator cap and the latter as the ejector cap.

Reference to Fig. 2 will show that in cutting out the door 2 a cylindrical ring or band 6 is left intact at the manipulator end of the grease gun and a similar ring 7 is left at the ejector end thereof. It will therefore be obvious that the caps 4 and 5 may be advanced to the position shown in Fig. 2 to overlap the ends of the door 2 and thereby hold the same in closed position, or, on the other hand, these caps may be partly withdrawn so as to free the ends of this door and permit the same to be swung open. Secured inside of the upper ring 6 is a ring 8 having a flange 9 which overlaps the edge of plunger 10 to prevent the same from being entirely withdrawn from the grease gun. This plunger 10 is pivotally secured to the actuator bolt 11 by means of a screw or the like 12, the actuator bolt being provided with some sort of manipulator means 13, such as a hand wheel.

Inside the ejector end of the gun is a ring 14, fitting tightly or secured to the band 7, this ring serving as an abutment for a perforated washer 15, provided on opposite sides with lugs 16 and 17 which extend through perforations 18 and 19 in opposite sides of the grease gun. It will be noted that a part of the ring 14 overlaps the door 2 to serve as an abutment for one end thereof, while a portion of ring 8 similarly overlaps the opposite end of the door 2 to serve as an interior abutment for this end. From Fig. 1 it will be noted that ring 14 is partly cut away as at 20 to permit the screw-threaded nipple 21 of the cartridge 22 to be slid into place as the cartridge is being inserted. When the cartridges are made, they are each provided with a piston means 23, such as a circular piece of leather or the like. This remains in the cartridge when it is inserted in the grease gun so that when the hand wheel 13 is turned the plunger 10 will be forced down against the piston 23 and will cause the same to be advanced to move the grease out of the cartridge. This grease then passes out through nipple 21 and ejector tube 24 to be applied where desired.

Cap 5 is provided centrally with an apertured boss 25 which is screw-threaded for attachment to the nipple 21 and for the reception of a correspondingly screw-threaded end of the ejector tube 24. It will be seen from the above that when the parts are assembled as shown in Fig. 2 and the hand wheel 13 is turned the grease will be forced outwardly through the nipple 21 and the tube 24 as stated above.

It should be noted that an internally and externally screw-threaded washer or nut 26 is applied to nipple 21 to hold the same in place in the aperture of the grease gun. Also ring 15 is internally screw-threaded for application to the external screw-threads of nut 26 so that, when applied in the position shown in Fig. 2, ring 15 becomes, in effect, a part of the cartridge, though it is, in reality, a part of the grease gun and should be removed from an empty cartridge and applied to a refill before the same is inserted in the grease gun. When the cartridge is in place, as shown in Fig. 2, lugs 16 and 17 will extend through the wall of the grease gun and will prevent rotation and longitudinal movement of the cartridge as the handwheel is turned. There will, however, be rotation of bolt 11 with respect to plunger 10 as indicated above. When it is desired to remove the cartridge, it is only necessary to unscrew the caps 4 and 5 until the door is freed, then open the door and push on the lug 16 until the cartridge slides out. The operation of refilling is merely the reverse of the operation of removing the empty cartridge. It will be found preferable in practice to supply each of the cartridges with a cap 27 to prevent dirt from getting into the cartridge. A plug or cap for the nipple will also be provided.

Figure 9:
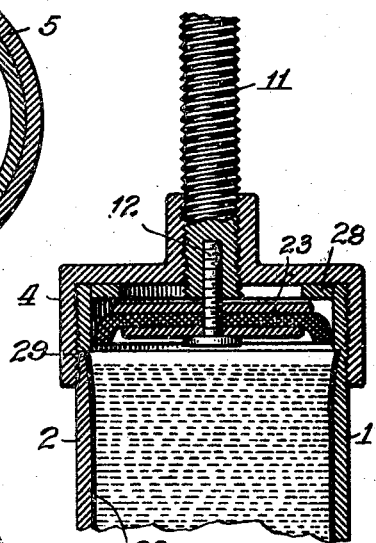
Fig. 9 is a longitudinal section, shown partially broken away, of a modified form of the grease gun to be used with a modified form of cartridge.
Figure 8:
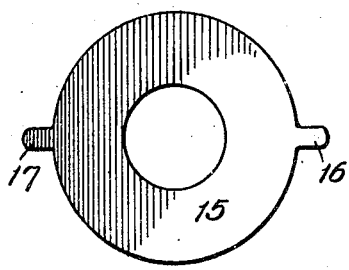
Fig. 8 is a plan view of a positioning and holding washer to be attached to the nipple of the cartridge.

In the form of my device shown in Fig. 9, a flanged ring 8 may be used or a mere flat ring 28 may be tightly secured within the manipulator end of the grease gun in any convenient way as by a tight fit, brazing or screw-threading. In this form of my device a groove 29 is provided around the interior of the gun for the reception of an outwardly flared end of the cartridge, the piston 23 being carried by the plunger and normally remaining fixed thereto. With the arrangement as shown in this figure the external edge of the piston cannot strike the edge of the cartridge and become distorted but will be directed into the cartridge to firmly engage the wall thereof and force the grease outwardly.

While I have shown and described herein specific forms of my device, it is of course understood that the specific description of structures set forth above may be departed from without departing from the spirit of my invention as set forth in this specification and the appended claims.

Having now described my invention, I claim:—

1. In a structure of the character described a container adapted to receive an auxiliary container therein, the first named container having a portion of its lateral wall cut away and hinged to the remainder of the container for lateral swinging, caps detachably connected to the ends of the container and adapted, when in fully applied position, to hold the cut away portion of the wall in closed position.

2. In a structure of the character described, a cylindrical container having a portion of its cylindrical wall cut away and hinged as a door to the remaining portion, said remaining portion having at its ends entire cylindrical portions provided with means for the attachment of caps, and caps attached to said ends and capable of overlapping the ends of the door to hold the same closed.

3. In a grease gun, a cylindrical body portion having a door intermediate its ends hinged thereto, an end of the body and the adjacent part of the door being provided with means for the attachment of a closure cap, a closure cap attached thereto and carrying means to be moved longitudinally through the cap to thereby force the contents of the grease gun therefrom.

4. In a grease gun, a cylindrical body portion having a door intermediate its ends hinged thereto, an end of the body and the adjacent part of the door being provided with means for the attachment of a closure cap, a closure cap attached thereto and carrying means through which the contents of the gun may be ejected and applied where desired.

5. In a grease gun, a cylindrical body portion having a hinged portion intermediate its ends, said body and hinged portion having attaching means for the attachment of end caps, end caps attached to the ends of the body portion and holding the hinged portion closed.

6. In a grease gun having a portion of its cylindrical wall hinged to form a door, the ends of the cylinder being screw-threaded for the attachment of end closure caps, rings fitting closely within the ends of the cylinder, one of said rings overlapping an end of the door to serve as an internal support for the same, and closure caps secured to the ends of the body portion and holding the door closed or permitting it to be turned on its hinges.

7. In a grease gun having a portion of its cylindrical wall hinged to form a door, the ends of the cylinder being screw-threaded for the attachment of end closure caps, rings fitting closely within the ends of the cylinder, one of said rings overlapping an end of the door to serve as an internal support for the same, and closure caps secured to the ends of the body portion and holding the door closed or permitting it to be turned on its hinges, one of said rings being flanged, a plunger operable through the cap at the end occupied by the flanged ring and of such a size that its edge will engage the flange when the plunger is withdrawn.

8. In a grease gun having a portion of its cylindrical wall hinged to form a door, the ends of the cylinder being screw-threaded for the attachment of end closure caps, rings fitting closely within the ends of the cylinder, one of said rings overlapping an end of the door to serve as an internal support for the same, closure caps secured to the ends of the body portion and holding the door closed or permitting it to be turned on its hinges, and a centrally apertured washer resting on said ring to serve as an abutment for one end of a grease container.

9. In a grease gun having a portion of its cylindrical wall hinged to form a door, the ends of the cylinder being screw-threaded for the attachment of end closure caps, rings fitting closely within the ends of the cylinder, one of said rings overlapping an end of the door to serve as an internal support for the same, closure caps secured to the ends of the body portion and holding the door closed or permitting it to be turned on its hinges, and a centrally apertured washer resting on said ring to serve as an abutment for one end of a grease container, said washer having fingers projecting from opposite edges to hold the same in position within the gun when the parts are in normal working position.

10. In a grease gun having a portion of its cylindrical wall hinged to form a door, the ends of the cylinder being screw-threaded for the attachment of end closure caps, rings fitting closely within the ends of the cylinder, one of said rings overlapping an end of the door to serve as an internal support for the same, closure caps secured to the ends of the body portion and holding the door closed or permitting it to be turned on its hinges, said ring being notched on the side adjacent the door to permit passage therethrough of the nipple of a replaceable grease container, and a centrally apertured washer resting on said ring to serve as an abutment for one end of a grease container.

11. In a structure of the character described, a container adapted to receive an auxiliary container therein, the first named container having a portion of its lateral wall cut away and hinged to the remainder of the container for lateral swinging, caps detachably connected to the ends of the container and adapted, when in fully applied position, to hold the cut away portion of the wall, a perforated washer having fingers extending from opposite sides and means within the main container to serve as a support for the washer.

12. In a grease gun, a body having an opening through which a container may be inserted in or removed from the body, a closure for the opening, end closure members connected to the body and cooperating with the closure of the opening for holding said closure in closed position.

13. In a grease gun, a body having an opening in the side thereof for the insertion and removal of a container, a closure for said opening, end caps attached to the body and acting to hold the closure in place, said caps when detached permitting the opening of said closure.

14. In a grease gun, a body having an opening in the side thereof for the passage of a container, a closure for the opening, end caps connected to the ends of the body and overlapping the ends of the closure for holding the closure in closed position.

15. In a grease gun, a body portion having an opening in the side thereof for the passage of a container, a closure for said opening, means within said body projecting beyond the ends of said closure serving as an abutment for said closure, and means on said body for holding said closure in position against said abutment.

16. In a structure of the character described, a cylindrical container having a portion of its cylindrical wall intermediate its ends cut away, a door of the same shape as the opening hinged to one edge thereof, means engaging the ends of the container and the ends of the door to entirely enclose a auxiliary container.

17. In a grease gun, a cylindrical body portion having a closure intermediate its ends hinged thereto, an end of the body and the adjacent part of the door being provided with means for the attachment of a closure cap, a closure cap attached thereto and having centrally arranged means to be connected to the outlet of a container located within the body portion.

18. In a grease gun, a body portion threaded at its ends and having a supporting ring fitting closely within one end, a cap engaging the threaded end to serve as a closure therefor, a perforated washer within the body portion and resting on the ring to serve as a support for an auxiliary container.

19. In a grease gun, a body portion threaded at its ends and having a supporting ring fitting closely within one end, a cap engaging the threaded end to serve as a closure therefor, a perforated washer within the body portion and resting on the ring to serve as a support for an auxiliary container supported on and secured to said washer, said cap having an internally screw threaded boss to inter-engage an auxiliary container having a screw threaded nipple.

In witness whereof, I hereunto subscribe my name to this specification.

HARRY B. HERSHINGER.